March 19, 1929.　　W. T. BARKER, JR　　1,705,955
WARE TRANSFERRING MECHANISM
Filed April 22, 1924　　12 Sheets-Sheet 1

Witness:
J. S. Grotta

Inventor:
Wm. T. Barker, Jr
by W. H. Honiss
Att'y.

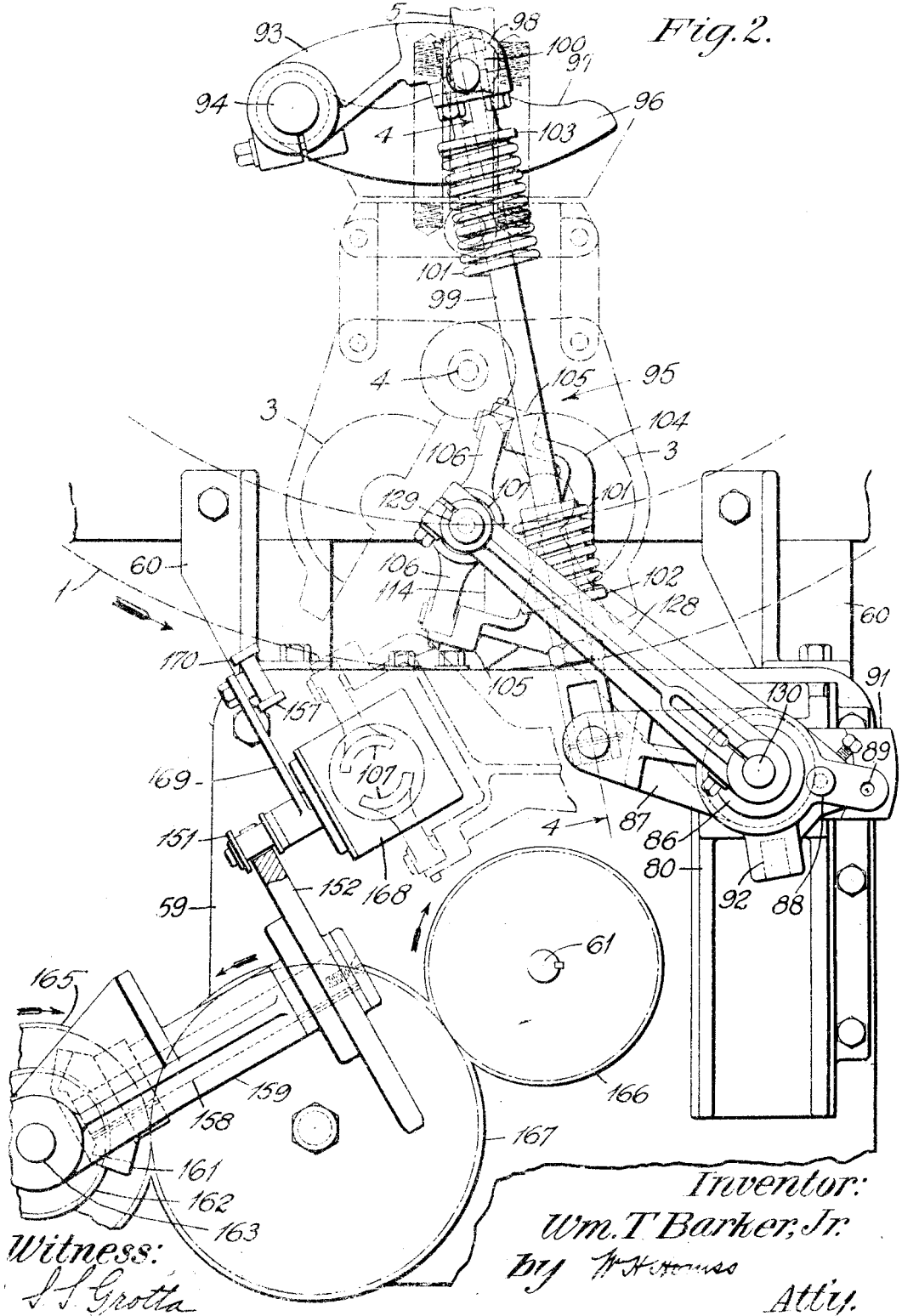

March 19, 1929.  W. T. BARKER, JR  1,705,955
WARE TRANSFERRING MECHANISM
Filed April 22, 1924  12 Sheets-Sheet 3
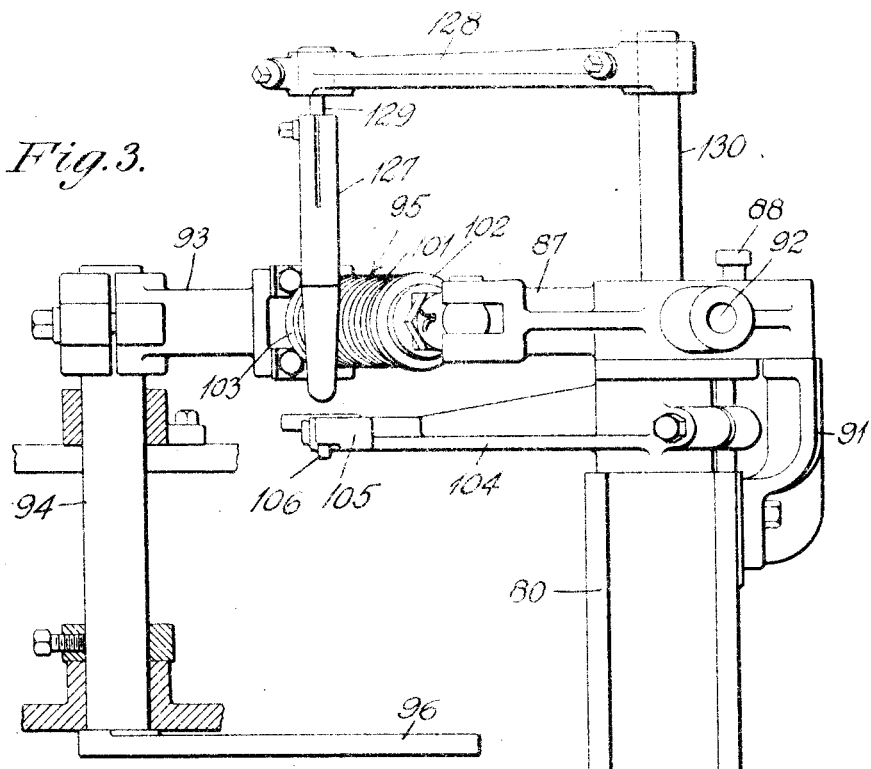
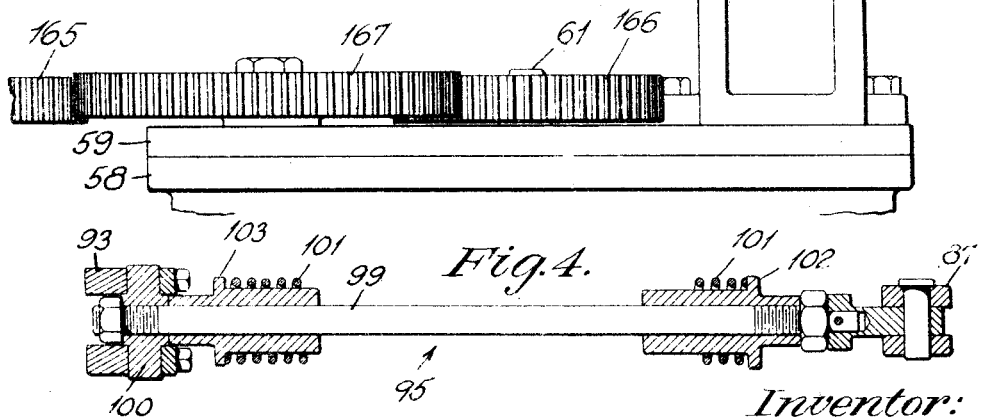
Witness:
S. S. Grotta
Inventor:
Wm. T. Barker, Jr.
by Jno. H. Honiss
Atty.

March 19, 1929.  W. T. BARKER, JR  1,705,955
WARE TRANSFERRING MECHANISM
Filed April 22, 1924   12 Sheets-Sheet 4

Witness:
S. S. Grotta

Inventor:
Wm. T. Barker, Jr.
by W. H. Honiss
Atty.

March 19, 1929.  W. T. BARKER, JR  1,705,955
WARE TRANSFERRING MECHANISM
Filed April 22, 1924   12 Sheets-Sheet 6

Witness:
S. J. Grotta

Inventor:
Wm. T. Barker, Jr.
by W. H. Honiss
Atty.

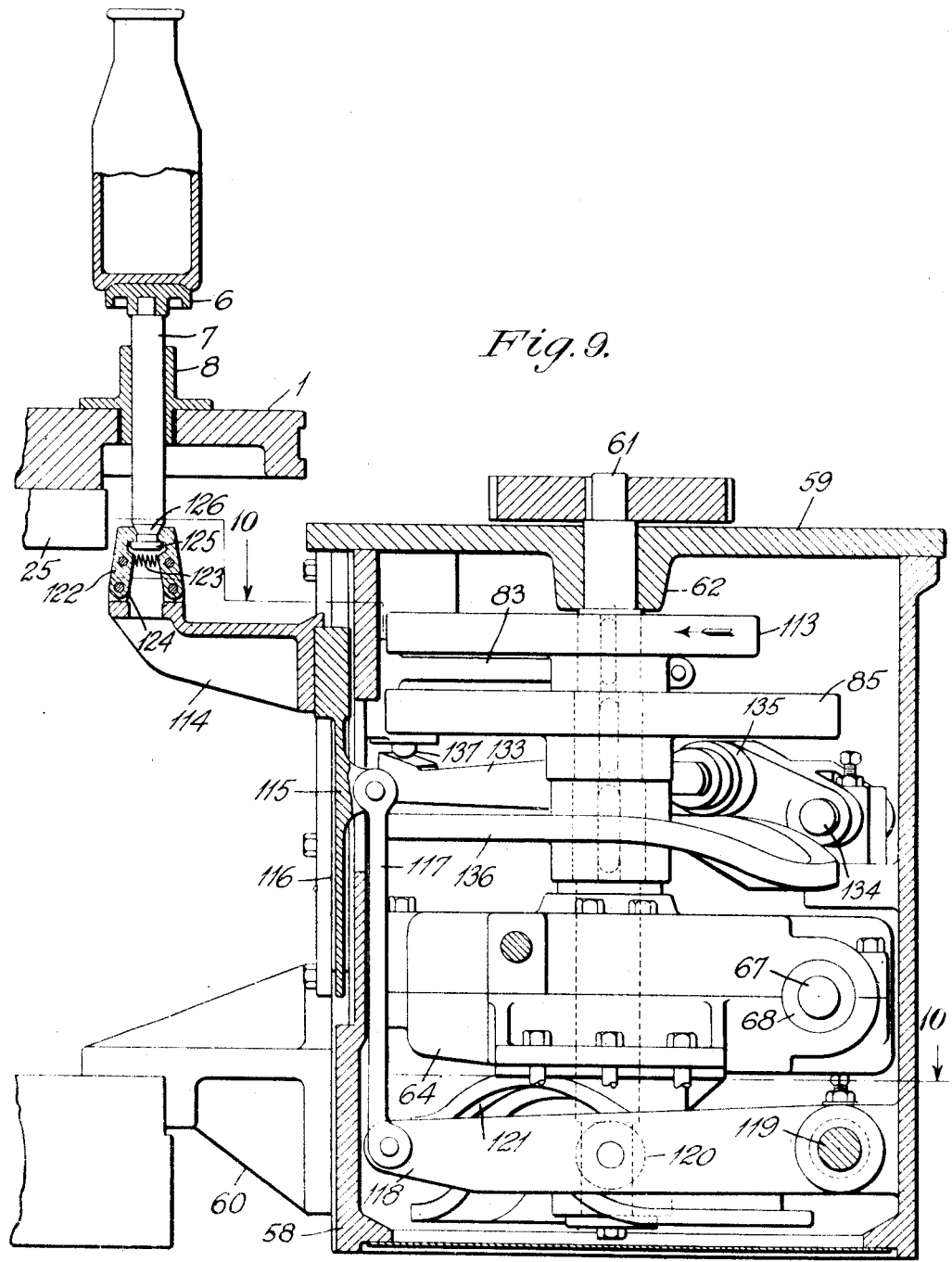

March 19, 1929.   W. T. BARKER, JR   1,705,955
WARE TRANSFERRING MECHANISM
Filed April 22, 1924   12 Sheets-Sheet 8

Witness: S. S. Grotta

Inventor: Wm. T. Barker, Jr.
by       Atty.

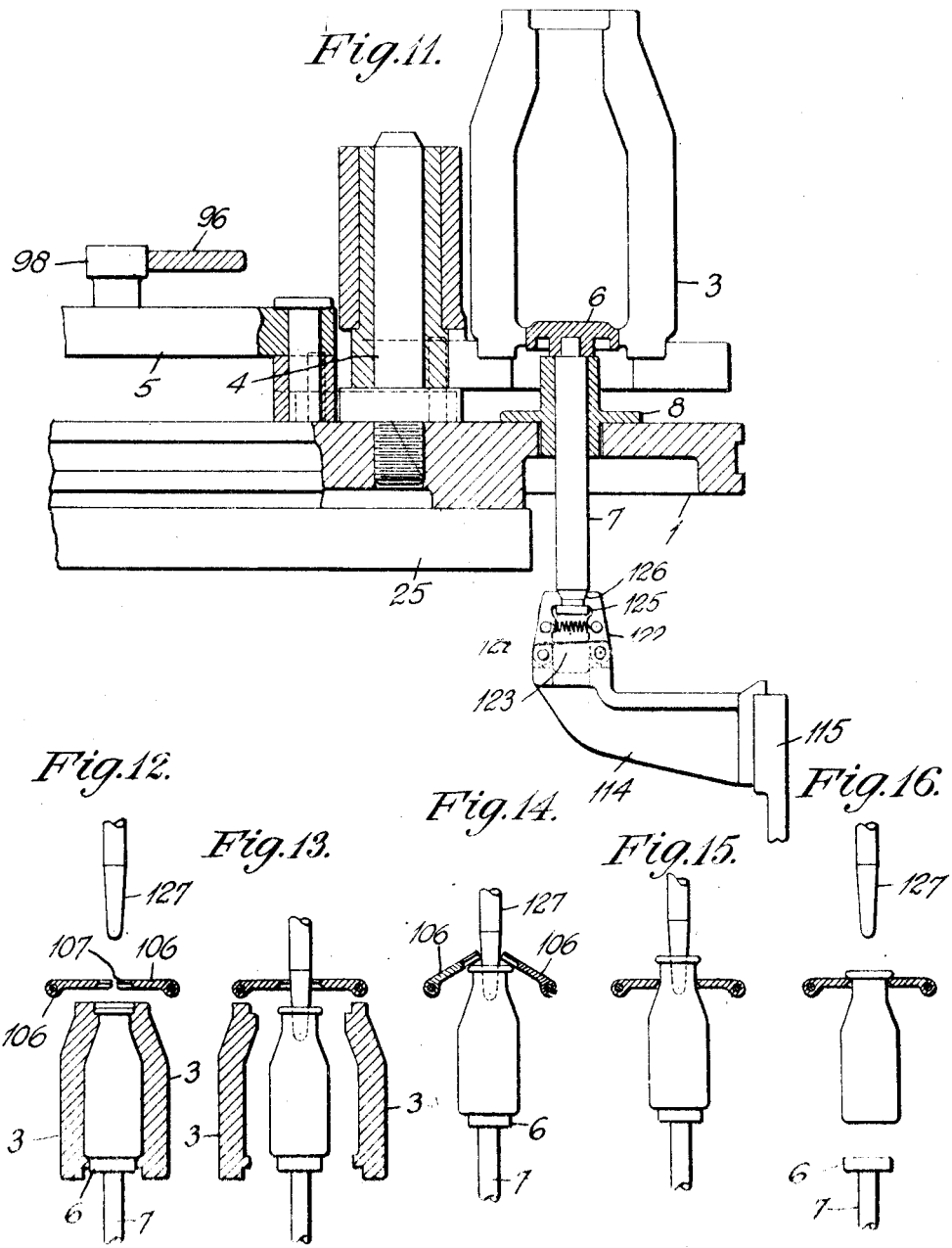

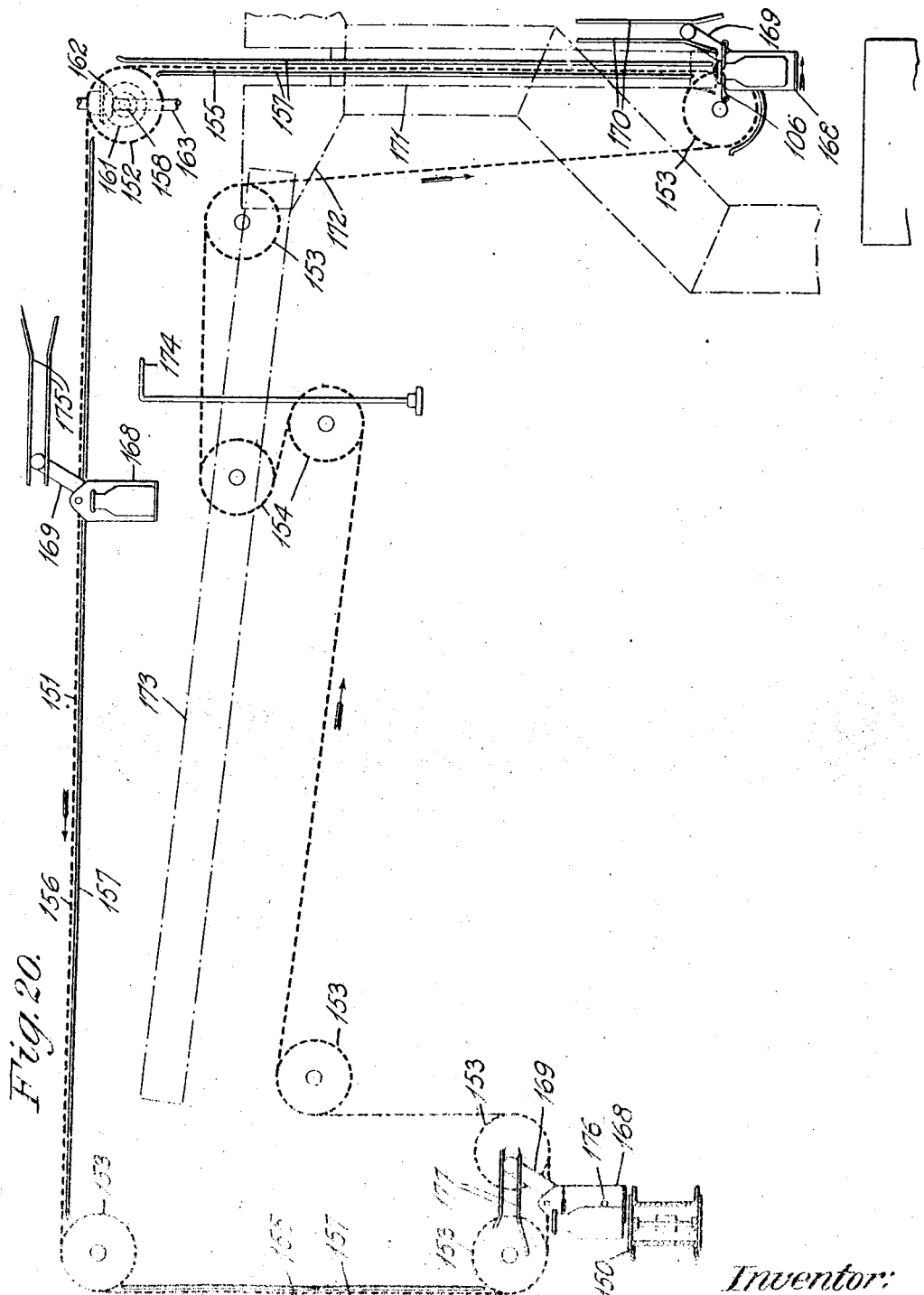

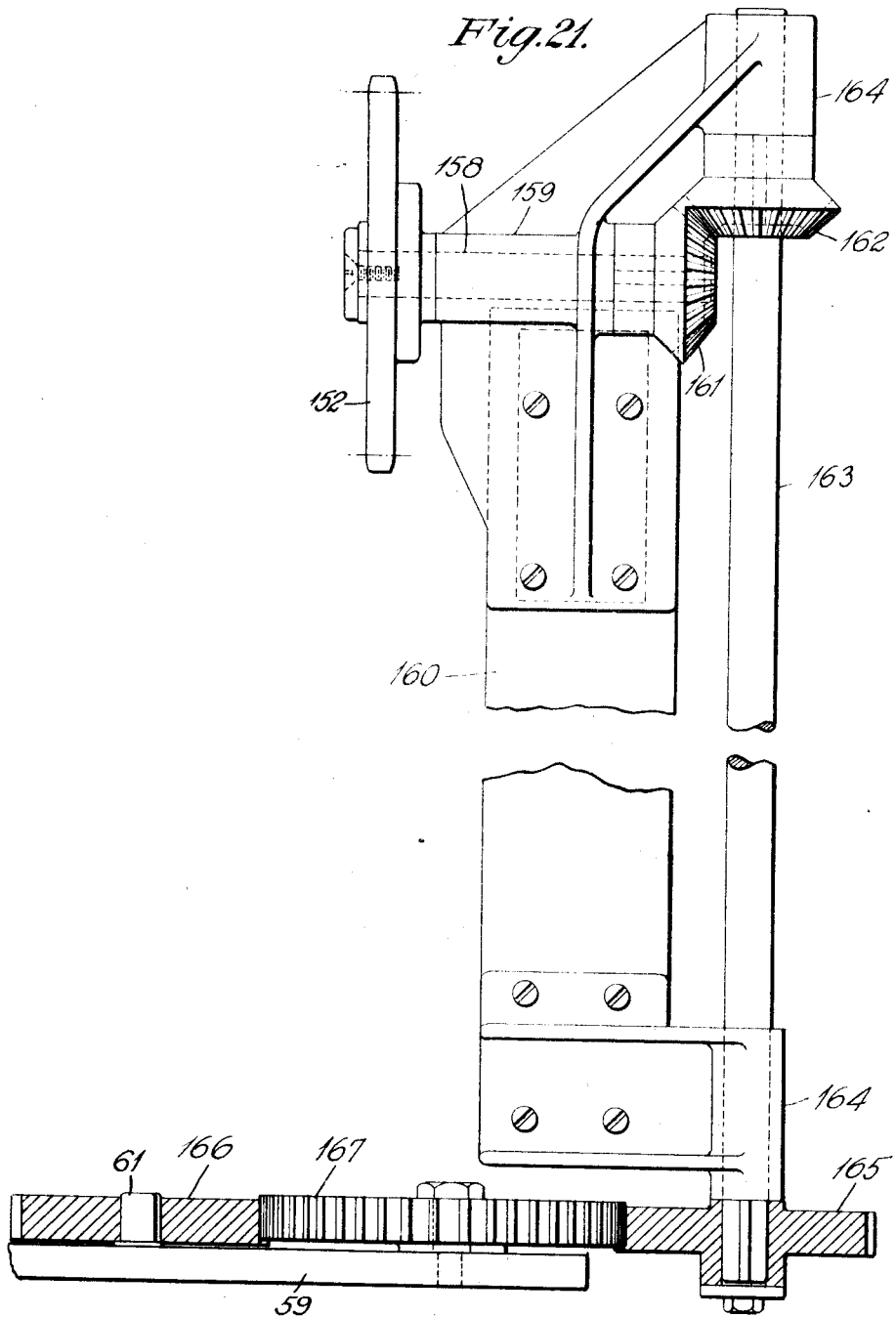

March 19, 1929.  W. T. BARKER, JR  1,705,955
WARE TRANSFERRING MECHANISM
Filed April 22, 1924  12 Sheets-Sheet 12

Witness:
S. S. Grotta

Inventor:
Wm. T. Barker, Jr.
by W H Honiss
Atty.

Patented Mar. 19, 1929.

1,705,955

UNITED STATES PATENT OFFICE.

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF DELAWARE.

WARE-TRANSFERRING MECHANISM.

Application filed April 22, 1924. Serial No. 708,168.

The invention relates to glass shaping machines, and particularly to ware transferring mechanism therefor.

One of the objects of the invention is to provide a ware transferring mechanism of a unitary character embodying efficient means for opening the molds of a shaping machine, raising the ware therefrom and into engagement with a transferring device, steadying the ware during such raising period, and delivering the same to a conveyor mechanism.

Another object of the invention is to provide a mechanism, of the character described, adapted to be driven by a shaping machine, and embodying mechanism whereby the stoppage of the shaping machine will automatically and simultaneously effect the stoppage of the transfer mechanism, and whereby the operation of the transferring mechanism may be independently discontinued without affecting the operation of the shaping machine.

Further objects of the invention include such novel features of construction as will appear from the accompanying specification and drawings of a specific embodiment of this invention.

Figure 1 of the drawings is a diagrammatic plan view of the apparatus showing the driving mechanism of the shaping machine and the connections with the ware transferring mechanism;

Fig. 2 is a plan view on a larger scale of a portion of the ware transferring mechanism.

Fig. 3 is a side elevation of the upper portion of the ware transferring mechanism;

Fig. 4 is a sectional elevation of the yieldable connection taken at 4—4 of Fig. 2.

Fig. 9 is a sectional elevation taken on line 9—9 of Fig. 10, illustrating the driving elements of the ware lifting mechanism;

Fig. 11 is a fragmentary sectional elevation through a mold and cooperating bottom plate;

Fig. 12 is a diagrammatic sectional elevation of a mold in its closed position with the fingers of the transferring mechanism disposed thereabove;

Fig. 13 is a view similar to Fig. 12, but illustrating the mold in its open position with the steadying pin in operative position;

Fig. 14 is a view showing the ware being raised into engagement with the fingers of the transferring mechanism by means of the bottom plate;

Fig. 15 is a view similar to Fig. 14 showing the fingers of the transferring mechanism in their horizontal active position;

Fig. 16 is a view similar to Fig. 15 showing the ware suspended between the fingers of the transferring mechanism, and with the bottom plate and steadying pin out of operative engagement with the ware;

Fig. 20 is a diagrammatic view of the conveyor mechanism;

Fig. 21 is an elevational view illustrating the driving mechanism of the conveyor;

Figure 23:
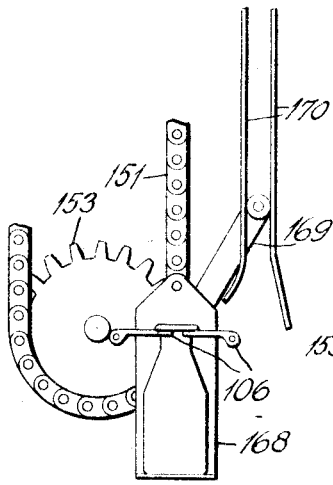
Figure 24:
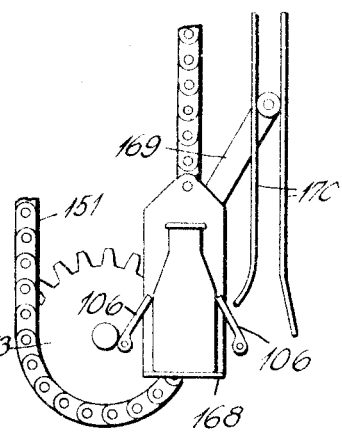
Figure 25:
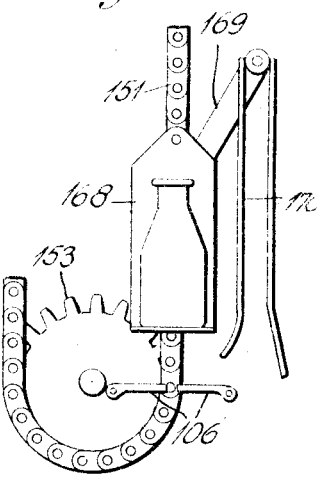
Figure 26:
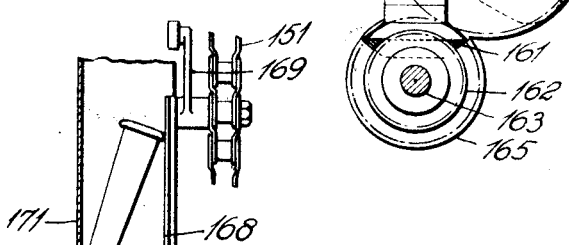

Figs. 23 to 25 inclusive are detail views illustrating various stages in the operation of transferring the ware from the transferring mechanism to the conveyor; and Fig. 26 is a sectional elevation illustrating the housing for temporarily retaining a blank or parison on a conveyor lift.

The ware transferring mechanism shown herein is of the class sometimes called a "take out", being adapted for taking the finished ware out of the molds of a glass shaping machine. It is herein shown associated with a glass shaping machine, which is constructed and operated substantially like that disclosed in Patent No. 1,316,550 and is designed to be operatively connected with certain of the ...ving and controlling elements of that machine in order to function in synchronism therewith.

The machine of the patent referred to is a duplex machine having mold tables disposed in right and left hand relation to each other and adapted to receive in alternation mold charges delivered from a single glass feeding device. In the patent referred to, the right hand machine of such a pair of associated shaping machines is selected for specific illustration and description, but in the present instance, a portion of the left-hand machine of such an organization and take out mechanism therefor are made the subject of illustration, it being understood that a right-hand take out mechanism embodying the present invention may be utilized in connection with a right-hand shaping machine by the reversal of its parts. While the take out mechanism is shown and described as a unitary structure it will be understood that it may by suitable changes, be incorporated in the structure of the shaping machine so as to become an inherent part thereof.

Figure 1:
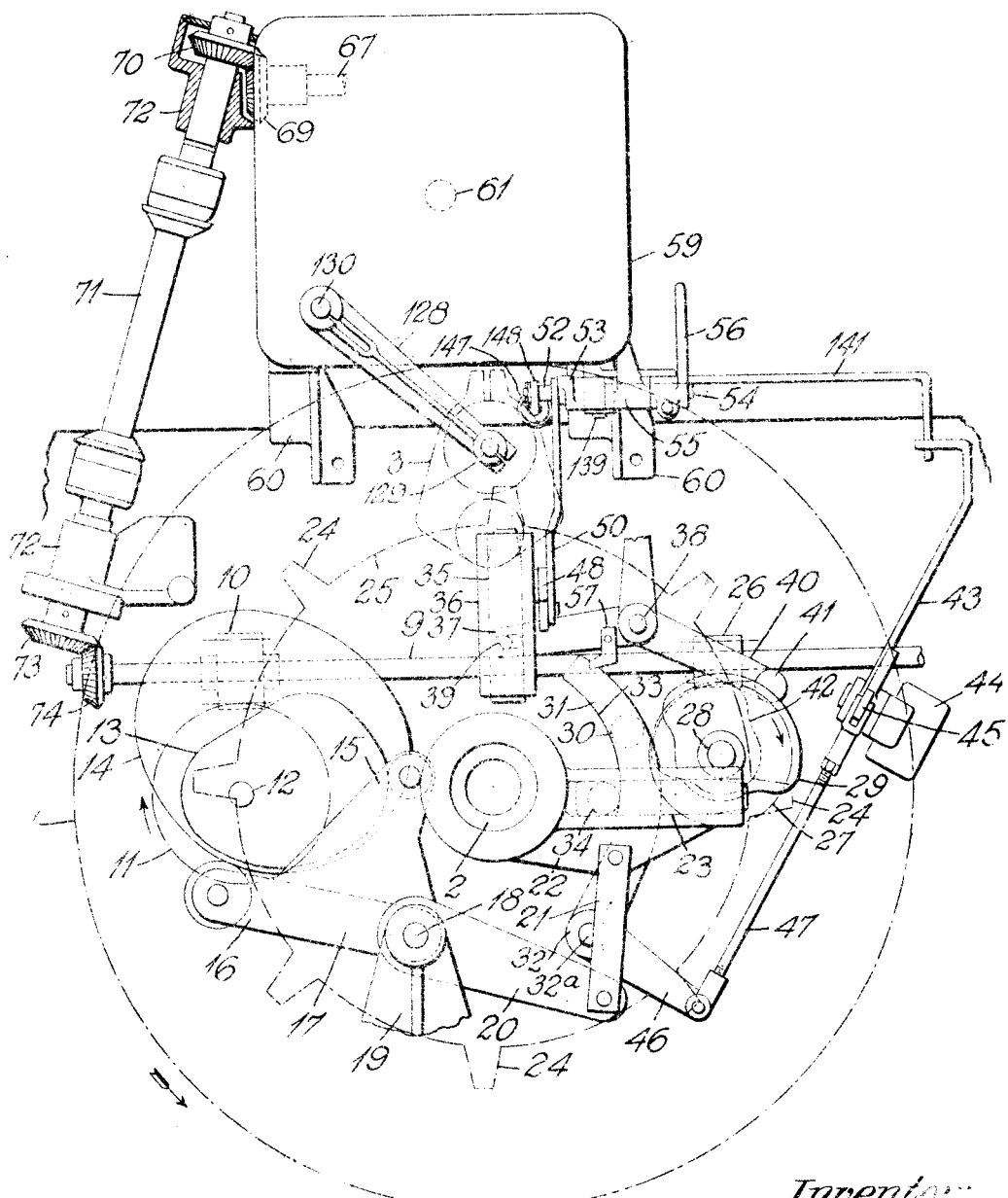

This left-hand machine has a mold table 1, shown by dotted lines in Fig. 1, mounted for intermittent rotation on a vertical spindle 2, and carries a plurality of divided molds, the halves 3 of which are hinged upon pins 4 secured to the table 1, (Figs. 2 and 11.) Each mold is opened and closed by a slide 5, which is connected to the mold halves by a suitable link connection, (Figs. 2 and 11) the actuating mechanism of which will be presently described. Each mold is provided with a bottom plate 6, carried by a vertical stem 7 which extends through the table and is slidably mounted in a suitable bearing 8, (Fig. 11).

The mold table 1 is rotated by means of a horizontal drive shaft 9, (Fig. 1) provided with a worm 10 which meshes with a worm gear 11 fixed to a vertically extending shaft 12. The shaft 12 is provided with two cams, 13 and 14, which respectively actuate arms 15 and 16 of a bell crank lever 17 which is pivotally mounted on a shaft 18. The shaft 18 is carried by a bracket 19 which is suitably secured to a stationary portion of the shaping machine, not shown. The cams 13 and 14 thus effect a positive, partial rotation of the table and prevent it from being carried past its stations by its momentum. A lever 20 is fixed to the lever 17 and is connected by means of a link 21 to a table rotator arm 22, which is pivoted upon the spindle 2 and carries a spring pressed rotator bolt 23 which periodically engages successive notches 24 in a ring 25, on the under-side of the table 1, and intermittently advances the table and the molds carried thereby. The ring 25 is provided with eight such notches, the table being adapted for eight molds.

The rotator bolt 23 is moved radially in the arm 22 to successively engage and disengage the notches 24 by means of the following described mechanism: On the drive shaft 9 is a worm 26 which drives a worm gear 27 fixed to a vertical shaft 28. A cam 29 fixed to the upper end of the shaft 28 acts against a roller 30 carried by an arm 31 of a bell crank lever 32 which is pivotally mounted at 32ᵃ upon a fixed portion of the machine, not shown. The arm 31 has an arcuate track 33 engaging a roller 34 on the rotator bolt 23. During the time that the rotator bolt 23 is in engagement with one of the notches 24 while advancing the table, the cam 29 permits the arm 31 to be held outwardly under the action of the spring pressed rotator bolt 23 and the roller 34 carried thereby. When the arm 22 and the bolt 23 reach the end of their active stroke, the cam 29 bears against the roller 30, swinging the arm 31 of the lever 32 inwardly. The arm 31, engages the roller 34 and forces the rotator bolt 23 radially inwards and out of the notch 24 with which it is in engagement at such time (Fig. 1). When the arm 31 is in this position the arcuate track 33 is concentric with the path of travel of the roller 34 and maintains the rotator bolt 23 in a retracted position during its return movement, which ceases when the rotator bolt 23 is in alignment with the next succeeding notch 24. At this stage the cam 29 releases the arm 31 which, in turn, releases the rotator bolt and permits it to move radially into engagement with a succeeding notch for the next advancement of the table.

To prevent the table from rotating while the rotator bolt is disengaged from the ring, a suitable locking mechanism is provided, consisting of a spring pressed lock bolt 35 mounted in a guide 36 carried by a stationary portion of the machine, not shown. This bolt is so located that a notch 24 is brought into alignment therewith when the rotator bolt 23 reaches the end of its forward movement, at which position the lock bolt 35 is pressed by its spring into the notch 24 and locks the table during the return stroke of the rotator arm 22. The lock bolt 35 is withdrawn from the notch 24 by means of a lever 37 pivotally mounted on a fixed stud 38 and has a slotted end engaging with a pin 39 on the lock bolt. An arm 40 fixed to the lever 37 is provided with a cam roll 41 for contact with a cam 42, which is fixed to the vertical shaft 28. The lock bolt cam 42 and the rotator bolt cam 29 are so set that when the latter withdraws the rotator bolt 23 from a notch 24 at the end of its forward stroke, the cam 42 will allow the lock bolt 35 to enter a succeeding notch 24 under the action of its spring. Conversely, when the cam 29 releases the rotator bolt 23 at the commencement of its forward or driving stroke, the cam 42 will, through the levers 40 and 37, withdraw the lock bolt 35 from its notch 24, thus releasing the table for its forward movement.

The rotator bolt 23 may be manually withdrawn from the table and held out by means of a treadle 43, pivotally mounted in a bracket 44, supported on the base of the machine, and provided with an upwardly extending arm 45 which is pivotally connected to an arm 46 of the lever 32 by means of a link 47. By this construction the operator may withdraw the rotator bolt and thus stop the table at any time during the operation of the machine.

Figure 17:
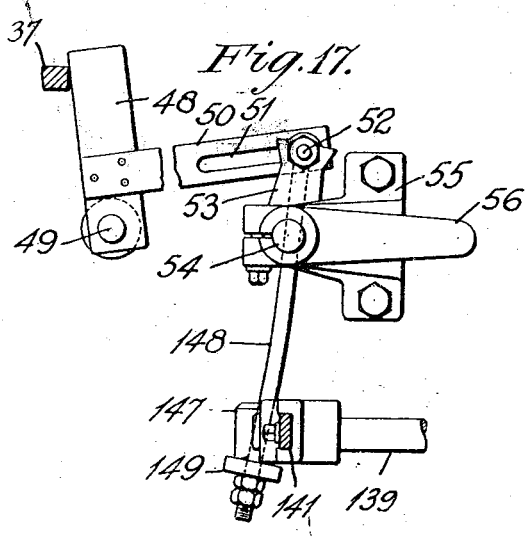
Fig. 17 is an enlarged detail view of the mechanism for operating the lock bolt of the shaping machine.
Figure 18:
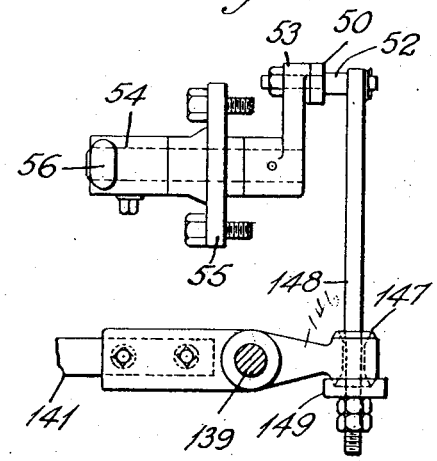
Fig. 18 is a view of the structure shown in Fig. 17 taken at right angles thereto.
Figure 10:
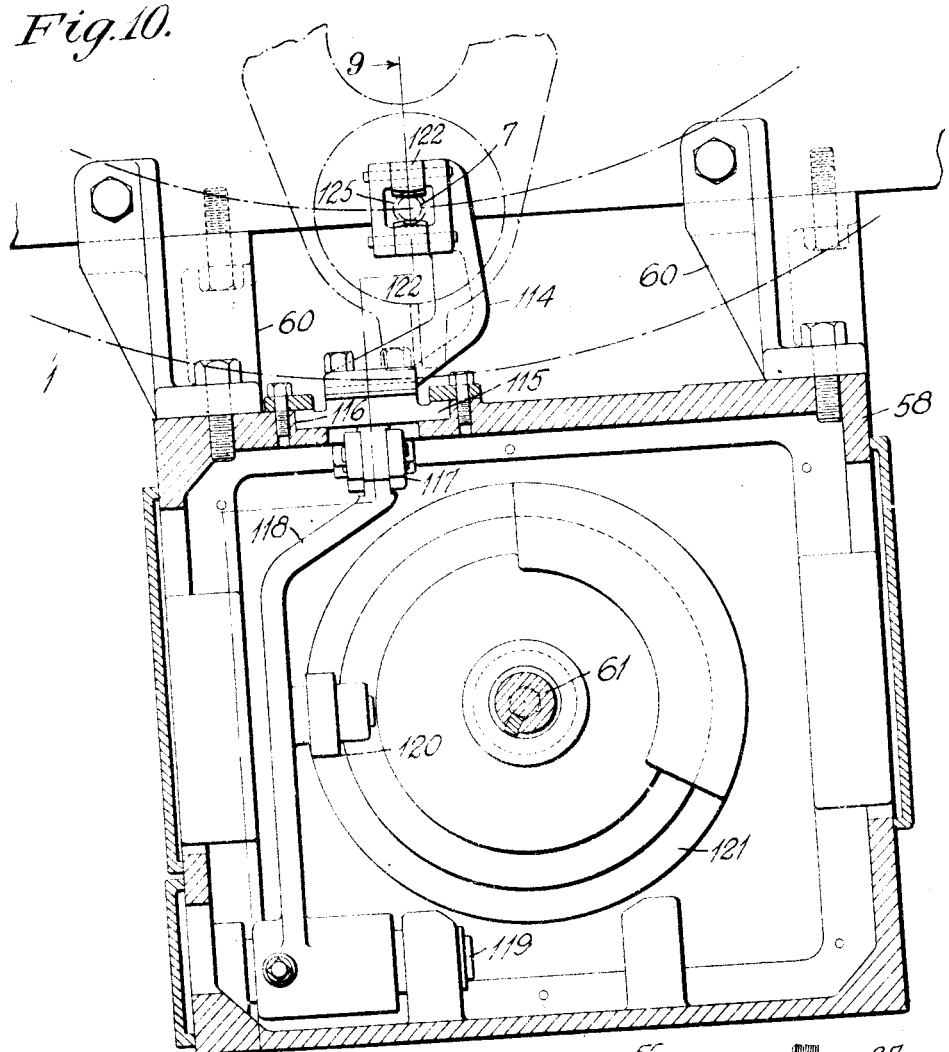
Fig. 10 is a sectional plan view taken on line 10—10 of Fig. 9.
Figure 19:
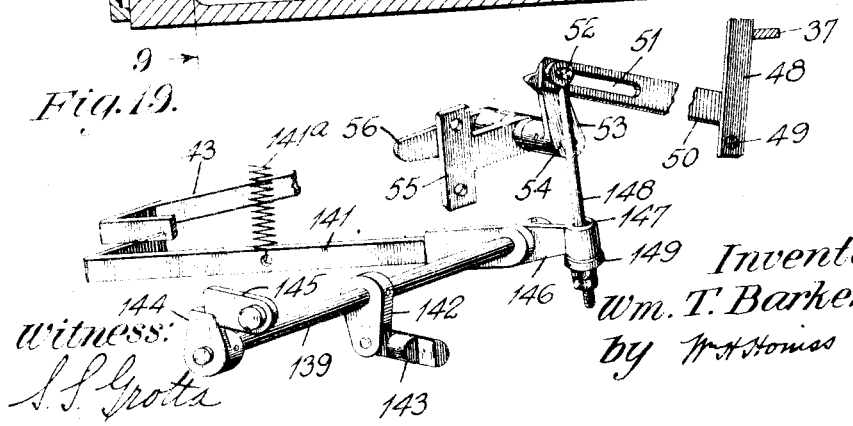
Fig. 19 is a diagrammatic perspective view of the structure illustrated in Figs. 17 and 18 and showing its relation to the elements controlling the operation of the shaping machine and those of the transferring mechanism.

It is sometimes desirable to rotate the table of the shaping machine by hand during an inoperative period to change the molds or to make other adjustments and in order to permit such free movement the lock bolt 35 may be retracted and held in a retracted position by means of a lever 48 (Figs. 1, 17, 18 and 19) which is pivoted as at 49 to a fixed portion of the machine, not shown, and which is adapted to bear against the lock bolt lever 37. The lever 48 is provided with an arm 50 having a slot 51 formed therein which is engaged by a crank pin 52 carried by an arm 53 which is fixed to a shaft 54 (Fig. 1). The shaft 54 is journaled in a bearing 55 carried by the casing of the ware transferring mechanism, presently to be described, and is provided with an operating handle 56. When it is desired to withdraw or hold out the lock bolt 35, the handle 56 is moved through an arc of 180°, thereby swinging the arm 53 in an upward direction and causing the lever 48 to force the arm 37 about its pivot 38 and withdraw the lock bolt 35 (Figs. 17 and 19). The lock bolt 35 is maintained in this retracted position until it is desired to again render it operative by reason of the fact that, when in this position, the crank arm 53 occupies a position past its dead center, relative to the link 148.

The rotator bolt 23 is also locked out of action during such time as the lock bolt 35 is rendered inoperative, through the medium of a pawl 57 (Fig. 1), which is carried by the lever 37 and adapted to engage behind the arm 31 of the bell crank lever 32. The rotation of the mold table of the shaping machine may thus be discontinued independently of the treadle 43, for the reason that if the lever 37 is moved to retract the lock bolt 35, the pawl 57 will be carried into the path of movement of the end of the arm 31 of the lever 32 and will fall behind the same upon the first inward movement of the arm 31. As thus far described the construction of the machine is substantially that disclosed in Patent 1,316,550 above referred to.

Figure 5:
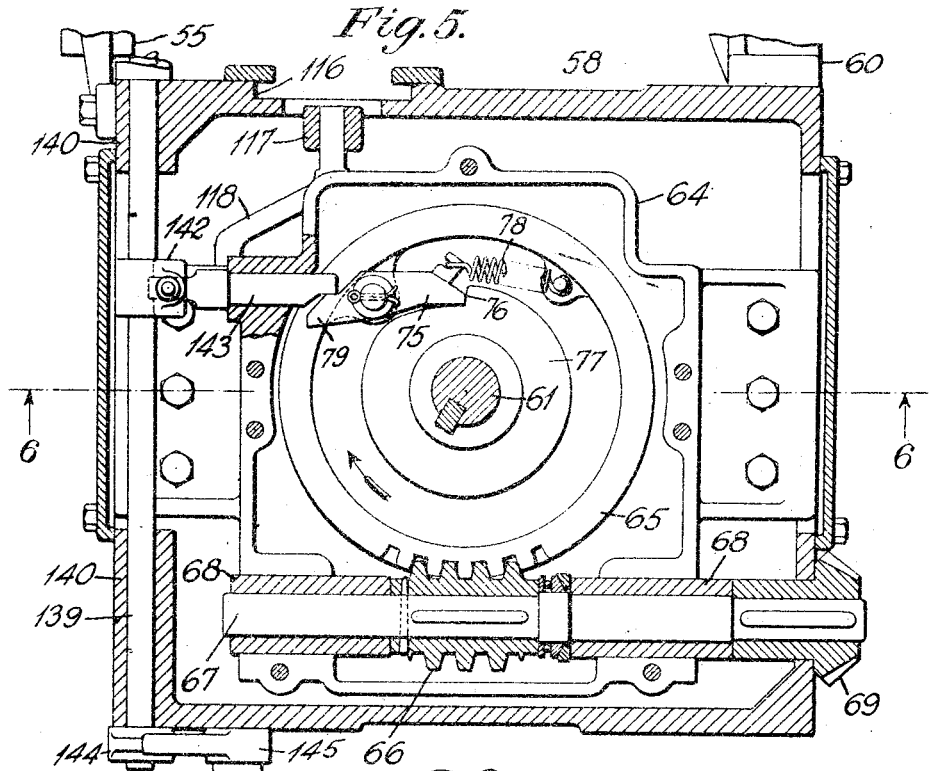
Fig. 5 is a sectional plan view of the driving elements of the transferring mechanism, taken on line 5—5 of Fig. 6.
Figure 6:
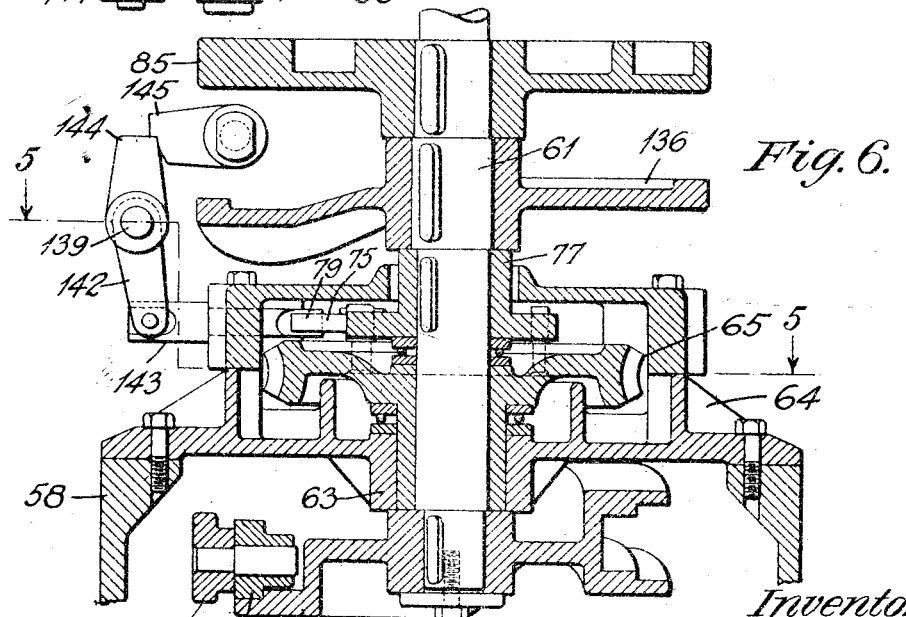
Fig. 6 is a sectional elevation of the driving mechanism, taken on line 6—6 of Fig. 5.
Figure 7:
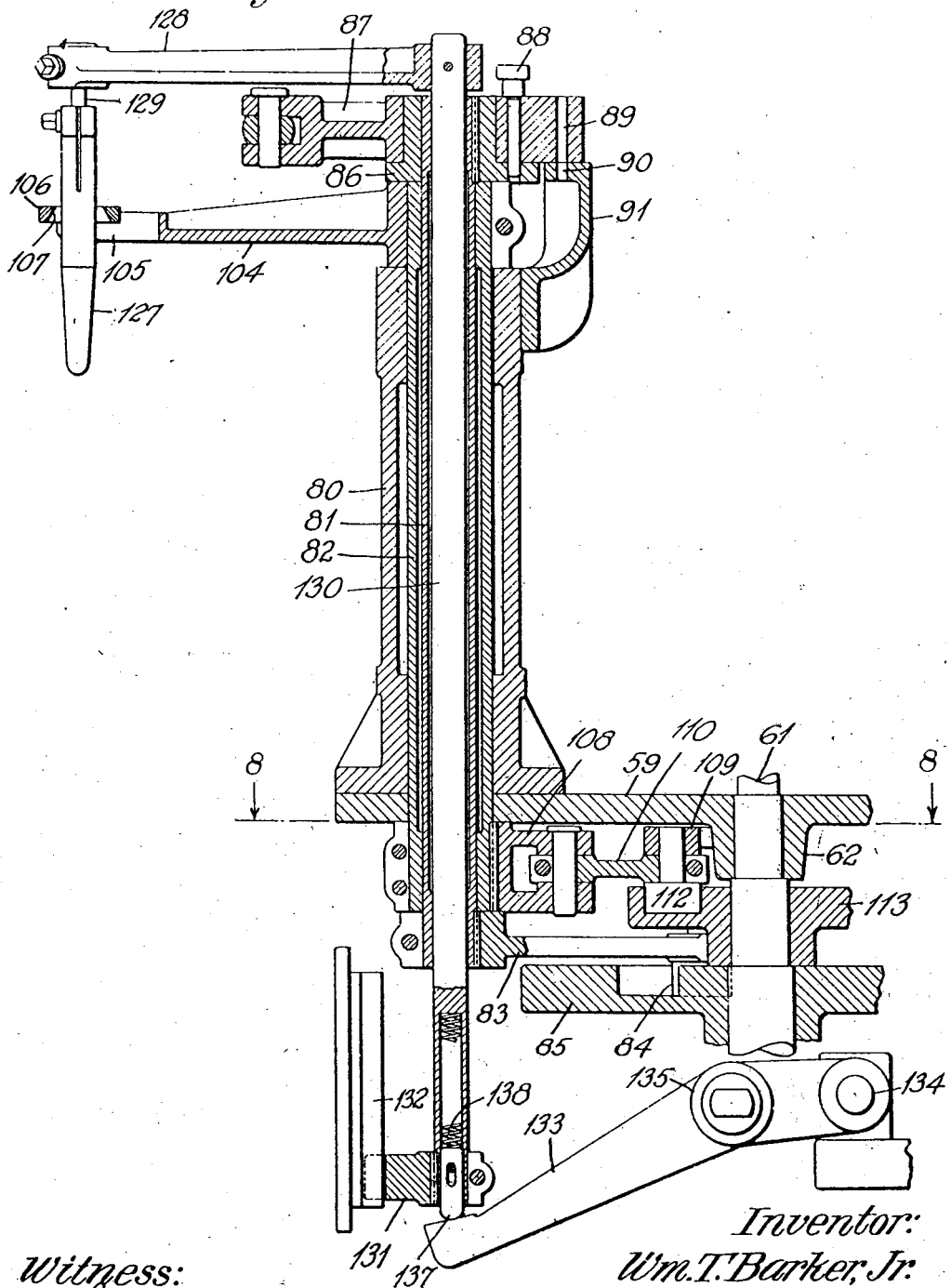
Fig. 7 is a sectional elevation of the transferring mechanism, certain elements being shown in the same plane for clearer illustration.

The ware transferring mechanism of the present invention is carried by a casing 58 which is provided with a cover 59, and which incloses the driving elements of the device. This casing is at one side of the shaping machine and its position is fixed with respect thereto by means of brackets 60 which are fixed to the side wall of the casing and to the base of the machine (Fig. 9). A vertically extending cam shaft 61 is disposed within the casing 58 and mounted in bearings 62 and 63, which are respectively carried by the cover 59 and a housing 64 (Figs. 6 and 7). A worm gear 65 is rotatably mounted on the shaft 61 and is driven by a worm 66 fixed to a horizontally extending shaft 67 (Fig. 5). This shaft is journaled in bearings 68 provided on the housing 64 and projects through the side wall of the casing and its outer end is provided with a bevel gear 69 which is driven by a bevel gear 70 fixed to one end of a shaft 71 (Fig. 1), which is mounted in bearings 72 and is provided at its other end with a bevel gear 73 which is driven by a bevel gear 74 fixed to the main drive shaft 9 of the shaping machine. A driving connection is effected between the worm gear 65 and the shaft 61 by means of a pawl 75 (Fig. 5) carried by the worm wheel 65, and adapted to engage a shoulder 76 formed in the periphery of a disk 77 which is keyed to the shaft 61. This pawl is normally held inwardly for engagement with the shoulder 76 by a spring 78 and is provided with a rearwardly extending finger portion 79, the function of which will be presently described.

The elements which open the molds, remove the ware therefrom and steady the ware during its removal from the molds are all carried by a tubular column 80 which is mounted on the cover 59 of the casing 58. This column constitutes a support for inner and outer concentric rock sleeves, 81 and 82 respectively, which extend vertically through the column and into the upper portion of the casing (Fig. 7). The sleeve 81 is rocked within the outer sleeve by means of an arm 83 which is fixed to its lower end and which is provided with a roller 84 for engagement with a cam 85 fixed to the shaft 61. A hub member 86 is fixed to the upper end of the sleeve 81 and provides a bearing for an arm 87 and to which the arm is fixed by means of a removable pin 88 during the normal operation of the machine.

The arm 87 is pivotally connected to an arm 93 which is fixed to a rock shaft 94, by means of a yieldable connection 95 (Figs. 2 and 4). The shaft 94 is journaled in bearings, which are carried by a stationary portion of the shaping machine. A mold opening lever 96, provided with a cam surface 97, is fixed to the lower end of the shaft 94 and is adapted to be intermittently moved across the path of travel of a roller 98 which is carried by the mold actuating rod 5. The action of the lever 96 is so timed that when a mold comes to rest at the transfer station, the lever 96 swings about its pivot and into engagement with the roller 98 thereby forcing the mold actuating rod 5 radially inwards to open the mold.

If for any reason it should become necessary to remove ware from the mold by hand, such as through a failure of the take-out mechanism to function, the molds may be opened by the rotation of the mold table by locking the lever 96 in fixed position with the cam surface 97 thereof in the path of the rollers 98. When the lever 96 occupies such a position, the rollers 98 will successively engage the cam surface 97 and be forced radially inwards to open the respective molds at the transfer station without depending upon the oscillation of the lever 96 for this purpose. This is accomplished by transferring the pin 88 to the apertures 89 and 90 which are respectively provided in the arm 87 and in a bracket 91 carried by the column 80 (Fig. 7). By so doing, the arm 87 is disconnected from the hub 86 and is locked to the bracket 91 in the position shown in Fig. 2. For convenience the arm 87 may be moved manually in order to align the apertures 89 and 90 by the use of a lever consisting of a bar or pipe inserted in a socket 92, which is provided for that purpose on the side of the arm (Figs. 2 and 3).

The yieldable connection 95 preferably comprises a rod 99, one end of which is pivotally connected to the arm 87. The other end of the rod 99 is slidably disposed in a block 100 which is pivotally connected to the arm 93. A coiled spring 101 surrounds the rod 99 and is disposed between collars 102 and 103 which are respectively carried by the rod 99 and the block 100 (Fig. 4). This construction provides a connection of sufficient rigidity to meet with normal operating conditions, but in the event that an abnormal strain is encountered, such as may be occasioned by a mold refusing to open, the movement of the lever 96 will cease when it engages the roller 98 of such mold, and the rod 99 will slide through the block 100 against the cushioning action of the spring 101. Also, if the lever 96 is locked in the path of the rollers 98, by means of the pin 90, as has been heretofore described in connection with the removal of the ware from the molds by hand, it will be forced about its pivot when a roller engages the cam surface 97, and cause the block to slide along the rod 99.

The take-out arm 104 is mounted on the outer rock sleeve 82 and has at its outer end arms 105 (Fig. 2) on which a pair of opposed fingers 106 (Figs. 2 and 12 to 16) are pivotally mounted, having their ends 107 shaped to clasp the neck of the bottle, or to catch under the head, or any convenient shoulder thereof. These fingers normally occupy a horizontal position, but are free to be swung upwardly by engagement with a bottle (Figs. 12 to 16).

Figure 8:
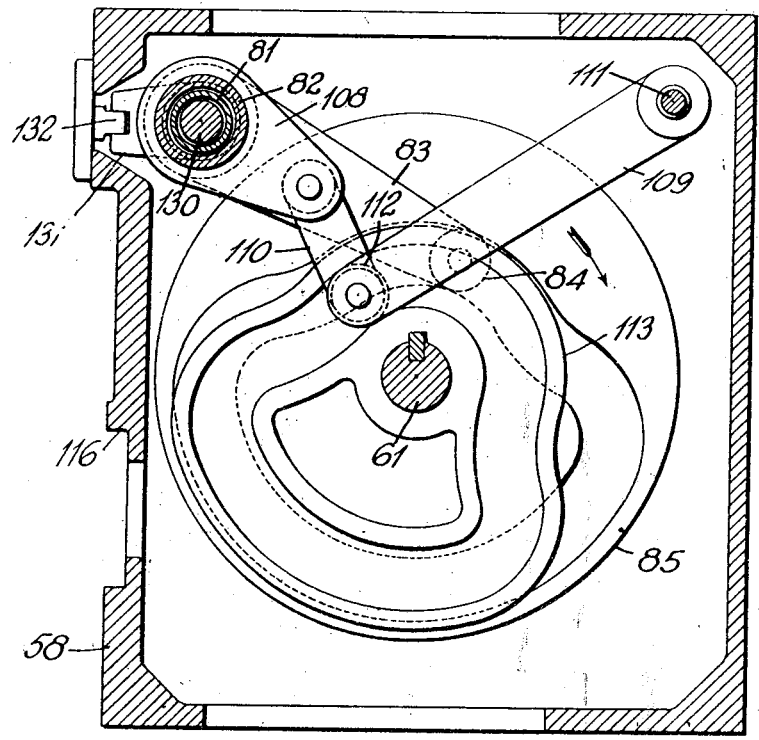
Fig. 8 is a sectional plan view taken on line 8—8 of Fig. 7, illustrating the driving mechanism of the transferring arm.

The take-out arm 104 is oscillated to and from a position above a mold at the transfer station to the position shown in dotted lines in Fig. 2 by means of an arm 108, which is fixed to the lower end of the outer rock sleeve 82. The arm 108 is in turn oscillated by an arm 109 (Figs. 7 and 8) to which it is connected by means of a link 110. The arm 109 is pivoted on the casing, as at 111, and is provided with a roller 112 for engagement with a cam 113, which is fixed to the power shaft 61.

The operation of taking out the ware is shown diagrammatically in Figs. 12 to 16. When, as here shown the top of the bottle does not project above the top of the mold, the bottle is pushed up from below by means of an arm 114 which is adapted to engage the lower end of the stem 7 of the mold bottom plate 6 and to raise the same (Fig. 9). The arm 114 is carried by a slide 115 mounted in ways 116 provided on a side wall of a casing 58. The slide is reciprocated in its ways by means of a link 117, the lower end of which is pivotally connected to one end of a cam lever 118, pivotally mounted at its other end to the casing 58 at 119 and having a cam roller 120 for engagement with a cam 121 fixed to the power shaft 61 of the transferring mechanism.

The possible breakage of the parts, if the molds fail to open, or if the ware becomes fixed therein, is provided against by having a slipping connection between the arm 114 and the stem 7. As shown in Figs. 9 and 11 the jaws 122 pivoted on the arm 114 are connected by a spring 123 and are provided with shoulder portions 124 which are adapted to engage the arm 114 to limit the inward movement of the jaws and to provide sufficient clearance for the passage therebetween of a head 125 formed on the end of the lifting stem 7. The stem 7 has a beveled portion 126 adjacent to the head 125 which is adapted to seat upon correspondingly inclined portions of the jaws 122. The spring 123 has sufficient tension to hold the jaws together while pushing up a bottle under normal conditions, but if the movement of the bottle is obstructed, the jaws will be forced apart by the beveled shoulder 126, permitting the arm 114 to complete its upward movement without injury to the mechanism. On the downward movement of the jaws, the bottom plate will be positively lowered through the engagement of the jaws with the head 125. The mechanism is so timed that rotation of the table carries the head 125 of the stem 7 between the jaws 122 in a lateral direction, and before the arm 114 commences its upward stroke.

When the mold 3 reaches the transfer station and is opened, the arm 114 raises the bottom plate 6 and elevates the ware from the mold. At this time the arm 104 of the transfer mechanism occupies the position shown in full lines in Fig. 2, with the fingers 106 over the mold. When a bottle is raised, the head of the bottle, which is larger than the opening between the fingers 106, raises and thus opens the fingers (Fig. 14) until they allow the head to pass through, when they fall back to a horizontal position surrounding the neck portion of the bottle (Fig. 15). The bottom plate 6 then descends and leaves the bottle suspended by its head between the fingers 106 (Fig. 16) ready to be swung to a delivery station.

To prevent dislodgment of the ware from the bottom plate 6 by the opening of the mold or while it is being elevated from the mold, a steadying pin 127 is provided which descends into the ware before the mold opens (Figs. 12 and 13) and raises therewith until it is properly positioned between the fingers 106 of the transferring arm (Figs. 14, 15 and 16). This pin also provides lateral support for blanks having imperfect bottom portions, such as may result from incomplete blowing, and which are therefore unable, of themselves, to stand in an upright position. The pin 127 is suspended from an arm 128 by means of a pin 129 (Fig. 7). The pin 129 is replaceable and is preferably made from a suitable frangible material, such as cast iron or brass, so that if undue strain is brought to bear upon the steadying pin 127, the pin 129 will break without causing other damage to the machine or to the pin 127. The arm 128 is fixed to the upper end of a non-rotatable, vertically movable rod 130, which is mounted to slide within the inner rock sleeve 81, being prevented from rotating by means of an arm 131 fixed to the lower portion of the rod and projects into a vertical guideway 132 on a side wall of the casing 58 (Fig. 7). The rod 130 is reciprocated to raise and lower the steadying pin 127 in timed relation to the horizontal swinging movement of the transfer arm 104 by means of a lever 133 pivotally mounted on the casing at 134 and provided with a cam roller 135 for engagement with a cam 136 fixed to the power shaft 61. A cushioned action between the rod 130 and the lever 133 is effected by means of a plunger 137, which is seated in a recess in the end of the rod 130 and is pressed by a spring 138 into engagement with the lever 133. By this construction the possible breakage of the parts is avoided in the event that the rod 130 should be improperly held up and dropped upon the lever.

The action of the steadying pin 127 with respect to the transfer arm is as follows:

Upon the arrival of a mold at the transfer station, the steadying pin 127 descends into the ware between the fingers 106 before the mold is opened, and rises simultaneously with the ware when the latter is elevated by the bottom plate 6. As soon as the ware is engaged between the fingers 106, the bottom plate 6 descends, as has been previously described, the steadying pin continuing to rise until it is entirely withdrawn from the ware. The transfer arm 104 then swings horizontally to transfer the ware to a delivery station, where it is removed by a conveyor mechanism, presently to be described.

The operation of the transferring mechanism may be discontinued, either simultaneously with that of the shaping machine, or independently thereof by means of the mechanism shown in Figs. 5, 6, 17, 18 and 19.

A rock shaft 139 extends transversely along one side of the casing 58 and is mounted in bearings 140 carried by a side wall thereof (Figs. 5 and 6). A treadle lever 141 (Figs. 1 and 19) is fixed at one extremity of the shaft 139 and extends to a position beneath the treadle lever 43 of the shaping machine. The lever 141 is held in an upward direction for engagement with the lever 43 by a spring 141ᵃ. An arm 142 is fixed to the shaft 139 and is pivotally connected to one end of a latch bar 143 which is slidably mounted in the bracket 64 for movement into and out of the path of travel of the finger portion 79 of the pawl 75. An arm 144 is also fixed to the shaft 139 and is engageable by a dog 145 which is pivoted to a side wall of the casing 58.

When the shaping machine is in operation, the treadle lever 43 oscillates vertically under the action of the cam 29 and the bell crank lever 32, moving the treadle 141 with it, and effecting a corresponding oscillation of the rock shaft 139 and the latch arm 142 and moving the latch bar 143 into and out of the path of travel of the finger portion 79 of the pawl 75. The pawl 75 is so positioned on the worm wheel 65 with respect to the reciprocation of the latch bar 143 that, under normal conditions, the finger portion 79 passes the latch bar when the latter is in a retracted position. If, however, the treadle bar 141 is held in a depressed position either by the treadle lever 43 or independently thereof, the latch bar 143 will be maintained in the path of the finger portion 79. As a result, the pawl 75 will be swung out at every rotation of the worm gear 65 so as to clear the shoulder 76, and will be thereby prevented from establishing a driving connection with the shaft 61. The operation of all the parts which receive power from the drive shaft 61 will consequently be discontinued. The mechanism is so timed that when the operation thereof is thus discontinued the various parts of the transferring mechanism occupy positions of safety remote from the shaping machine and without the path of travel of the molds and their associated parts. If it is desired to maintain the transferring mechanism inoperative independently of the operation of the shaping machine, the treadle lever 141 is maintained in its depressed position with the latch bar 143 extending into the path of the pawl 75, by moving the dog 145 into engagement with the arm 144, as illustrated in (Figs. 5, 6 and 19).

It is desirable, however, to stop the ware-transferring mechanism when the handle 56 is operated to stop the operation of the shaping machine, thereby effecting the stoppage of both of these machines by a single manual operation. To this end, the treadle lever 141 is provided with an arm 146, (Figs. 17, 18 and 19) the extremity of which is formed with an eye portion 147. A link 148 carrying an abutment 149 at its lower end, extends loosely through the eye 147 and is pivotally connected at its upper end with the crank arm 53, which actuates the lock bolt mechanism of the shaping machine. During the normal operation of the machine, the arm 53 extends downwardly with the link 148 depending therefrom, and the abutment 149 disposed out of the path of travel of the eye portion 147 of the arm 146. When the parts occupy such positions, the arm 146 is free to oscillate under the action of the treadle lever 43 and spring 141, with the eye portion thereof sliding freely along the link 148. If, however, the lever 56 of the latch bolt mechanism is moved to the position shown in full lines in Figs. 17 and 18 to push out the lock bolt 35 and discontinue the operation of the shaping machine, the arm 53 will be swung upwardly and raise the link 148. The raising of the link 148 elevates the abutment 149 against the eye 147 and maintains the arm 146 in a raised position with the latch bar 143 disposed in the path of the pawl 75, thereby discontinuing the operation of the transfer mechanism simultaneously with that of the shaping machine.

Conveyor mechanism (Fig. 20) is preferably provided for removing the ware from the transfer arm 104 and delivering it to a desired point, such as to a carrier 150, or to an annealing leer. The conveyor herein shown, (Figs. 20 to 26) embodies an endless chain 151 which is mounted on a drive sprocket wheel 152 and a plurality of supporting and idler sprocket wheels 153 and 154, which are carried by a suitable frame structure, not shown, and arranged to provide vertical reaches 155 and an intermediate horizontal reach 156. These portions of the chain are prevented from sagging or being laterally displaced by means of guide bars 157. The guide sprocket wheel 152 is affixed to one end of a shaft 158 journaled in a bearing 159 carried by a standard or bracket 160 supported in any desired manner (Fig. 21). A bevel gear 161 is keyed to the other end of the shaft 158 and is driven by a similar gear 162 fixed to the upper end of a vertically extending shaft 163. The shaft 163 is journaled in bearings 164 carried by the standard 160, and is provided at its lower end with a spur gear 165. This gear is driven by a gear 166 keyed to the upper end of the shaft 61 of the transferring mechanism through the medium of an intermediate gear 167 which is mounted on the cover 59 of the casing 58.

Figure 22:
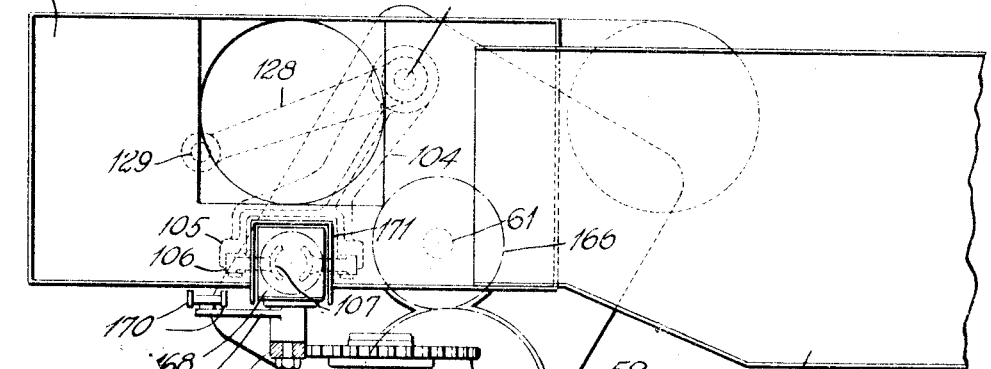
Fig. 22 is a plan view showing the relative position of the conveyor with respect to the transferring mechanism and the cullet chute.

A plurality of buckets or lifts 168 having three open sides are pivotally suspended on the chain 151 and are adapted to successively pass under the ware as the latter are conveyed into their path of movement by the transfer arm 104, and to lift the ware vertically between the fingers 106, as is best shown in Figs. 22 to 24 inclusive. Each of the lifts 168 is provided with an off-set arm 169 which is adapted to project into a guideway 170, in order to steady the lifts and to prevent any swinging movement thereof while they are removing the ware from the transfer arm 104. A channel or housing 171 (Fig. 26) is provided adjacent to the point where the ware is removed from the transfer arm and through which the lifts are adapted to pass in their upward travel along the reach 155 of the conveyor. This housing forms a closure for the three open sides of a lift passing therethrough, and prevents a parison or incompletely blown ware which may be inadvertently delivered to the conveyor by the transfer arm, and which, through its peculiar shape, cannot stand in an upright position, from falling off of the lift and into the transfer mechanism. The housing 171 terminates adjacent to a cullet chute 172 into which such incomplete ware may fall upon emerging from the housing. The chute 172 is provided with a lateral continuation 173 which extends beneath the horizontal reach 156 of the conveyor and into which imperfect ware may fall when dislodged from the lifts by an ejector arm 174. This arm may be projected manually into the path of imperfect ware as it passes along the horizontal reach of the conveyor. The lifts 168 are steadied at this point by a guideway 175 which is engaged by the steadying arm 169. When the lifts reach the carrier 150, the ware is intercepted by a stationary rod or arm 176 which prevents further movement of the ware but which allows the lifts to pass laterally from supporting engagement with the ware, thereby depositing it on the carrier 150. The lifts are steadied at this point by means of a guideway 177, which is engaged by the arm 169 of the conveyor lifts.

The particular embodiment of the invention illustrated and described has been selected by way of example only, and it is to be understood that various modifications, arrangements and combinations may be employed in fulfilling the spirit of the invention defined in the claims.

What I claim is:—

1. The combination with a glass shaping machine embodying an intermittently movable support, a series of molds carried thereby, means for opening said molds, of a ware transfer mechanism comprising means for actuating said mold opening means during a period of dwell in the movement of said table, means for removing the ware from said molds, means for rendering said ware removing means inoperative, and means for maintaining said mold opening means in position to open said molds during the movement of said table to permit the ware to be removed from said molds by hand when said ware removing means is inoperative.

2. The combination with a glass shaping machine, embodying a mold and means for opening said mold, of a transfer mechanism comprising means for actuating said mold opening means, means for raising the ware from said mold, and means for steadying the ware during such raising movement.

3. The combination with a glass shaping machine, embodying a mold and means for opening said mold, of a transfer mechanism comprising means for actuating said mold opening means, means for raising the ware from said mold, means for steadying the ware during such raising movement and means for removing the ware from said molds and said raising means.

4. The combination with a glass shaping machine embodying a mold, of a transfer mechanism provided with means for removing the ware from said machine, means for raising the ware from said molds and into engagement with said removing means, and means adapted to descend into said ware and to raise therewith for steadying the same during such raising movement and directing it into accurate engagement with said removing means.

5. The combination with a glass shaping machine embodying a mold, and means for opening said mold, of a transfer mechanism provided with means for actuating said mold opening means and independent means adapted to move into operative engagement with the ware to steady the same during the opening movement of the mold.

6. The combination with a glass shaping machine embodying a mold, of a transfer mechanism provided with means for opening said mold, means for removing the ware from the shaping machine to a point of delivery, means for raising the ware from the mold and into said removing means, and a pin adapted to enter said ware to steady the same while the mold is being opened and during the raising movement of the ware.

7. The combination with a glass shaping machine embodying a mold, of a ware transferring mechanism including a pair of take-out tongs, means for elevating the ware from said mold and into engagement with said tongs, and a member adapted to be projected into the ware to steady the same during its raising movement and to be withdrawn therefrom after the ware has been engaged by said tongs.

8. The combination with a glass shaping machine embodying a mold, of a ware transferring mechanism provided with means for raising the ware in said mold, separate means for removing the ware therefrom, means adapted to be projected into the ware to steady the same during the raising period and to be withdrawn therefrom and moved to an inoperative position during the removing period.

9. The combination with a glass shaping machine embodying a mold, of a transfer mechanism provided with a transfer arm, vertically swinging ware supporting fingers carried by said arm, means for raising the ware from the mold and suspending it between said fingers, and means adapted to descend into the ware to steady the same during its upward movement and to direct imperfectly formed ware into operative engagement with said fingers.

10. The combination with a glass shaping machine embodying a mold having a vertically movable bottom plate, of a ware transferring mechanism provided with means for raising said bottom plate to elevate the ware from said mold, and yieldable means associated with said raising means adapted to permit the operation of said raising means should the movement of said bottom plate be obstructed.

11. A glass shaping machine comprising in combination an intermittently rotatable mold table, means for locking said table between its periods of rotation, means for rendering said locking means inoperative at will, a ware transferring mechanism associated with said table, and means whereby said transferring mechanism is stopped when said locking means is rendered inoperative.

12. The combination with a glass shaping machine, of a transfer mechanism embodying a take-out element, continuously moving means for moving said element toward and away from the shaping machine, means adapted to be actuated at any time but effective to disconnect said transfer mechanism from said moving means only at a predetermined time in its cycle of operation to automatically stop said take-out element in a position remote from said shaping machine.

13. The combination with a glass shaping machine, of a transfer mechanism embodying a take-out element, continuously moving means for moving said element toward and away from said shaping machine, and means adapted to be actuated to stop the shaping machine, and to subsequently disconnect said moving means from said element to automatically stop the take-out element when it has reached a predetermined position remote from the shaping machine.

14. In a glass shaping machine comprising, in combination, a mold table, means for intermittently rotating said table, means for locking said table between its periods of rotation, means operable at will for rendering said locking means inoperative, means for rendering said rotating means inoperative when said locking means is rendered inoperative, and ware transferring mechanism associated with said table, and means whereby said transferring mechanism is stopped at a predetermined position when said locking means is rendered inoperative.

15. A glass shaping machine comprising, in combination, a mold table, molds carried thereby, means for intermittently rotating said table, means for locking said table between its periods of rotation, means operable at will for rendering said locking means inoperative, means for breaking the driving connection between said table and the rotating means when the said locking means is rendered inoperative, ware transferring mechanism associated with said table for removing glass from said molds, means for independently stopping said transferring mechanism, and means for rendering said locking means inoperative and breaking the driving connection between the table and the rotating means when the operation of the transferring mechanism is discontinued.

16. A glass shaping machine comprising, in combination, a mold table, molds thereon, means for imparting an intermittent rotation to said table, means for locking said table between its periods of rotation, means operable at will for rendering said locking means inoperative, means for maintaining said rotating means inoperative when the said locking means are rendered inoperative, ware transferring mechanism associated with said table including a movable take-out element, means for stopping said transferring mechanism independently of the shaping machine with the element at a position clear of the molds, and means for rendering inoperative the said locking means and the said rotating means when the operation of the transferring mechanism is discontinued.

17. The combination with a glass shaping machine, of a ware transferring mechanism and a conveyor mechanism driven by said transferring mechanism adapted to receive said ware and move it vertically from said transferring mechanism.

18. The combination with a glass shaping machine, of a ware transferring mechanism and a conveyor provided with a plurality of lifts adapted to receive and remove ware vertically from said transferring mechanism.

19. The combination with a glass shaping machine, of a ware transferring mechanism and a conveyor provided with a plurality of lifts adapted to receive and remove ware vertically from said transferring mechanism.

20. The combination with a glass shaping machine, of a ware transferring mechanism, a conveyor driven by said transferring mechanism and having a plurality of lifts pivotally suspended therefrom and adapted to receive and remove ware vertically from said transferring mechanism, and means for maintaining said lifts against lateral movement during such removing operation.

21. The combination with a glass shaping machine, of a ware transferring mechanism provided with a take out element, a plurality of fingers carried by said element, means for elevating ware vertically into engagement with said fingers, and a conveyor driven by said transferring mechanism and provided with a plurality of lifts adapted to remove said ware from said transferring mechanism by raising the ware vertically between said fingers.

22. The combination with a glass shaping machine, of a ware transferring mechanism provided with a take out element, fingers pivotally carried by said element, means for elevating ware from said shaping machine and leaving it in a position suspended between said fingers, a conveyor driven by said transferring mechanism and provided with a plurality of lifts adapted to pass vertically between said fingers to remove the ware therefrom.

23. The combination with a glass shaping machine, of a ware transferring mechanism provided with a take out arm, fingers pivoted for vertical movement on said arm, means for elevating ware from said shaping machine and leaving it in a suspended position between said fingers and means for elevating said ware from engagement with said fingers.

24. The combination with a ware shaping machine, of a ware transferring mechanism, a take out element carried thereby, vertically swinging fingers pivotally mounted on said element, means for elevating ware from said shaping machine, leaving it in a suspended position between said fingers, and a conveyor driven by said transferring mechanism and adapted to elevate said ware between and from engagement with said fingers.

25. A device for removing glassware from the molds of a shaping machine, comprising a pair of pivoted ware engaging jaws arranged to swing toward and from each other, means to hold the jaws yieldingly toward each other, a carrier for the jaws, means for relatively moving the carrier and the ware to open the jaws by engagement with the ware, then to support the ware by the jaws, and means to pass the ware upwardly through the jaws.

26. Apparatus for making glassware, comprising an intermittently rotated table, a series of molds thereon, mold opening mechanism comprising a cam located at a fixed station relative to the table and cooperating mechanism associated with each mold, means for holding the cam in the path of the cooperating mechanism as the latter moves with the table, and means for holding the cam out of the path of said mechanism as it moves and for moving the cam to actuate the mold opening mechanism while they are stationary.

27. Apparatus for making glassware, comprising an intermittently rotated table carrying a series of molds, a mold opening cam, actuating mechanism connected therewith by which the cam is moved to open the molds while they are stationary, means for disconnecting the actuating mechanism from the cam, and means for holding the cam in position to open the molds while they are moving.

28. Apparatus for making glassware, comprising an intermittently rotated table carrying a series of molds, a mold opening cam, an actuating mechanism by which the cam may be moved to open the molds while stopped, a yielding connection between the cam and its actuating mechanism, means for disconnecting the yielding connection from the actuating mechanism, and means for holding the disconnected end of the yielding connection in fixed position whereby the cam is held yieldingly in position to open the molds while they are moving.

29. Apparatus for making glassware comprising a ware shaping machine having a series of intermittently movable molds, a take-out device in operative relation thereto, and means actuated by the take-out device for opening the molds during a period of dwell in the movement of said molds.

30. Apparatus for making glassware, comprising a carrier, a series of molds mounted thereon, means for intermittently advancing the carrier, means for locking the carrier in a stationary position, manually operated means for unlocking the carrier while stationary, a take out, and connections between said manual means and the take out whereby the take out will be stopped when the carrier is unlocked.

31. A glass shaping machine embodying a traveling mold, means for opening said mold, means for actuating said opening means, a ware transferring mechanism associated with said mold for removing the glass therefrom and adapted to operate said actuating means, and means for locking said actuating means in the path of said mold opening means to actuate the same when the operation of said transferring mechanism is discontinued.

32. A glass shaping machine embodying a traveling mold, means for opening said mold, means for actuating said opening means, a ware transferring mechanism associated with said mold for removing the glass therefrom and adapted to yieldably operate said actuating means, and means for locking said actuating means in the path of said opening means to actuate the same independently of said transferring mechanism when the operation of the latter is discontinued.

33. A glass shaping machine embodying a traveling mold, means for opening said mold, means for actuating said opening means, a ware transferring mechanism associated with said mold for removing the glass therefrom and adapted to operate said actuating means, and means for locking said actuating means yieldably in the path of said opening means to actuate the same independently of said transferring mechanism when the operation of the latter is discontinued.

34. A glass shaping machine embodying a traveling mold, means for opening said mold, a lever for actuating said opening means and provided with a cam surface, a ware transferring mechanism associated with said mold for removing the glass therefrom and adapted to move said lever to actuate said opening means, and means for locking said lever with the cam surface thereof in the path of said opening means to actuate the same independently of said transferring mechanism when the operation of the latter is discontinued.

35. The combination with a glass shaping machine including a mold having means for opening said mold, and means for elevating the ware therein, of a take-out device, comprising means for actuating said mold opening means, means for actuating said ware elevating means, and means for removing the ware from said mold and said elevating means.

Signed at Hartford, Connecticut, this 21st day of April, 1924.

WILLIAM T. BARKER, Jr.